United States Patent [19]
Turcotte et al.

[11] Patent Number: 5,754,139
[45] Date of Patent: May 19, 1998

[54] METHOD AND INTELLIGENT DIGITAL BEAM FORMING SYSTEM RESPONSIVE TO TRAFFIC DEMAND

[75] Inventors: Randy Lee Turcotte, Tempe; Stephen Chih-Hung Ma, Mesa; Sergio Aguirre, Phoenix, all of Ariz.

[73] Assignee: Motorola, Inc., Schaumburg, Ill.

[21] Appl. No.: 739,529

[22] Filed: Oct. 30, 1996

[51] Int. Cl.$^6$ ................................................ H01Q 3/22
[52] U.S. Cl. .......................... 342/373; 342/372; 342/374
[58] Field of Search .................................. 342/373, 372, 342/374, 354

[56] References Cited

U.S. PATENT DOCUMENTS

| | | | |
|---|---|---|---|
| 3,737,899 | 6/1973 | Georgopoulos | 343/5 R |
| 4,845,504 | 7/1989 | Roberts et al. | 342/457 |
| 4,996,532 | 2/1991 | Kirimoto et al. | 342/81 |
| 5,059,966 | 10/1991 | Fujisaka et al. | 342/25 |
| 5,086,302 | 2/1992 | Miller | 342/373 |
| 5,392,257 | 2/1995 | Gilmour | 362/135 |

*Primary Examiner*—Thomas H. Tarcza
*Assistant Examiner*—Dao L. Phan
*Attorney, Agent, or Firm*—Gregory J. Gorrie

[57] ABSTRACT

An intelligent digital beam former (10) in conjunction with a satellite based array antenna (20) provides a plurality of dynamically controllable antenna beams (52) for communication with subscriber units (90) in response to demand for communication services. Geographic portions within the satellite's footprint that have a higher-demand for communication services are dynamically provided additional antenna beams while geographic portions having a lower demand for communication services are provided less antenna beams. When used on a non-geostationary satellite, the digital beam forming coefficients are dynamically adjusted to steer the antenna beams to maintain their ground location. The antenna beams are also shaped to help optimized geographic coverage.

15 Claims, 10 Drawing Sheets

METHOD AND INTELLIGENT DIGITAL BEAM FORMING SYSTEM RESPONSIVE TO TRAFFIC DEMAND

CROSS-REFERENCE TO RELATED APPLICATIONS

The present invention is related to the following co-pending United States patent applications which are assigned to the same assignee as the present invention:

(1) "Logarithm/Inverse-Logarithm Converter Utilizing Linear Interpolation and Method of Using Same", having Ser. No. 08/391,880, filed on Feb. 22, 1995;

(2) "Logarithm/Inverse-Logarithm Converter Utilizing a Truncated Taylor Series and Method of Use Thereof", having Ser. No. 08/381,167, filed on Jan. 31, 1995;

(3) "Logarithm/Inverse-Logarithm Converter and Method of Using Same", having Ser. No. 08/381,368, filed on Jan. 31, 1995; and (4) "Logarithm/Inverse-Logarithm Converter Utilizing Second-Order Term and Method of Using Same", having Ser. No. 08/382,467, filed on Jan. 31, 1995.

The subject matter of the above-identified related inventions is hereby incorporated by reference into the disclosure of this invention.

This application is also related to co-pending United States patent application entitled "METHOD AS SYSTEM FOR DIGITAL BEAM FORMING", having Ser. No. 08/654,946, filed on May 29, 1996 which is assigned to the same assignee as the present application.

This application is also related to co-pending United States patent application entitled "METHOD AND INTELLIGENT DIGITAL BEAM FORMING SYSTEM WITH IMPROVED SIGNAL QUALITY COMMUNICATIONS", having Ser. No. 08/739,645 filed on Oct. 30, 1996, and to co-pending United States patent application entitled, "METHOD AND INTELLIGENT DIGITAL BEAM FORMING SYSTEM FOR INTERFERENCE MITIGATION", having Ser. No. 08/739,528 filed on Oct. 30, 1996, both filed concurrently herewith.

FIELD OF THE INVENTION

This invention relates to the field of phased array antennas and in particular to digital beam forming.

BACKGROUND OF THE INVENTION

Satellite communication systems have used phased array antennas to communicate with multiple users through multiple antenna beams. Typically efficient bandwidth modulation techniques are combined with multiple access techniques and frequency separation methods are employed to increase the number of users. However, with the electronic environment becoming increasingly dense with the proliferation of wireless personal communication devices such as cellular telephones and pagers, even more information and sophistication are required for these wireless communication systems. For example, with all the users competing for the limited frequency spectrum, the mitigation of interference between the various systems is a key to the allocation in the spectrum to the various systems.

Furthermore, the concept of spectral sharing, e.g., the ability of multiple systems to simultaneously use common spectrum, is of major importance to governmental bodies such as the Federal Communications Commission (FCC) granting communication licenses to satellite system operators.

Thus what is needed is a communication system that mitigates interference between other systems while sharing spectrum with those other systems. Thus, what is also needed are an apparatus and method that can share and provide for the sharing spectrum with other communication systems.

Although a variety of techniques for beam forming have been developed, current digital beam forming antenna systems lack the computational performance required by many communication system applications. Consequently, there is a need for a digital beam forming system that provides high-performance computational power at low cost.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a digital beam former suitable for use in array antennas. In the preferred embodiment the digital beam former provides a method of mitigating interference from interfering signals. The present invention also provides a method of tracking the location of interfering signals and readjusts the digital beam forming coefficients to create nulls in the antenna pattern directed towards that interfering signal. The present invention also provides a digital beam former that mitigates interference from interfering signals.

The present invention also provides a method of communicating with communication terminals, subscriber units, relays or aircraft using an array antenna having a digital beam former. In a preferred embodiment, digital beam forming coefficients are adjusted to improve or maximize the signal quality of communication signals received from the communication terminals. In one embodiment of the present invention, the communication terminal provides the satellite with quality indicators which indicate the quality of the signals received by the communication terminal. In response to received link quality indicators, the digital beam former on board the satellite dynamically adjusts its antenna beam pattern to help optimize the signal transmitted to the communication terminal. In another embodiment of the present invention, the digital beam forming coefficients are readjusted to continually help maintain and help improve or maximize the signal quality of the received signals as the communication terminal and the satellite change their relative positions.

The present invention also provides a method of communicating with communication terminals using a digital beam former on board a satellite based array antenna. The digital beam former coefficients are adjusted to provide more antenna beams to geographic regions having high demand for communication services and also adjusted to provide fewer antenna beams to regions having a low demand for communication services. In the preferred embodiment, as the demand for communication services changes with respect to geographic location, the digital beam former of the present invention dynamically assigns antenna beams or assigns additional beams in response to the changes in demand for communication services. The present invention also provides a communication terminal, such as a subscriber unit, that communicates with satellites, communication stations or other communication terminals using an array antenna configured with a digital beam former.

Analog array antennas are well known in the art. Antenna beam characteristics are controlled by adjusting the amplitude and phase of the received or transmitted signal of each array element. Through these controls, each antenna beam can be shaped, its pointing direction can be defined, antenna nulls can be directed, etc. Multiple amplitude and phase adjustments can be used to create multiple antenna beams.

Because of the complexity of these systems, most analog array antennas that generate multiple beam patterns are phased arrays that use a butler matrix to combine the signals from each array element. In general, once a butler matrix and combining network is built the characteristics of the antenna beams remain fixed. In the present invention a digital beam former is used to dynamically control the amplitude and phase of each of the radiating elements to form multiple antenna beams. Characteristics of the beams such as pointing direction of the main beam, pointing direction of any of the other beams, the bandwidth, location of nulls, corrections for aperture irregularities and other characteristics of the beams are all controlled through the use dynamic adjustment of the beam coefficients. Such flexibility is not possible in analog phased array implementations.

Figure 1:
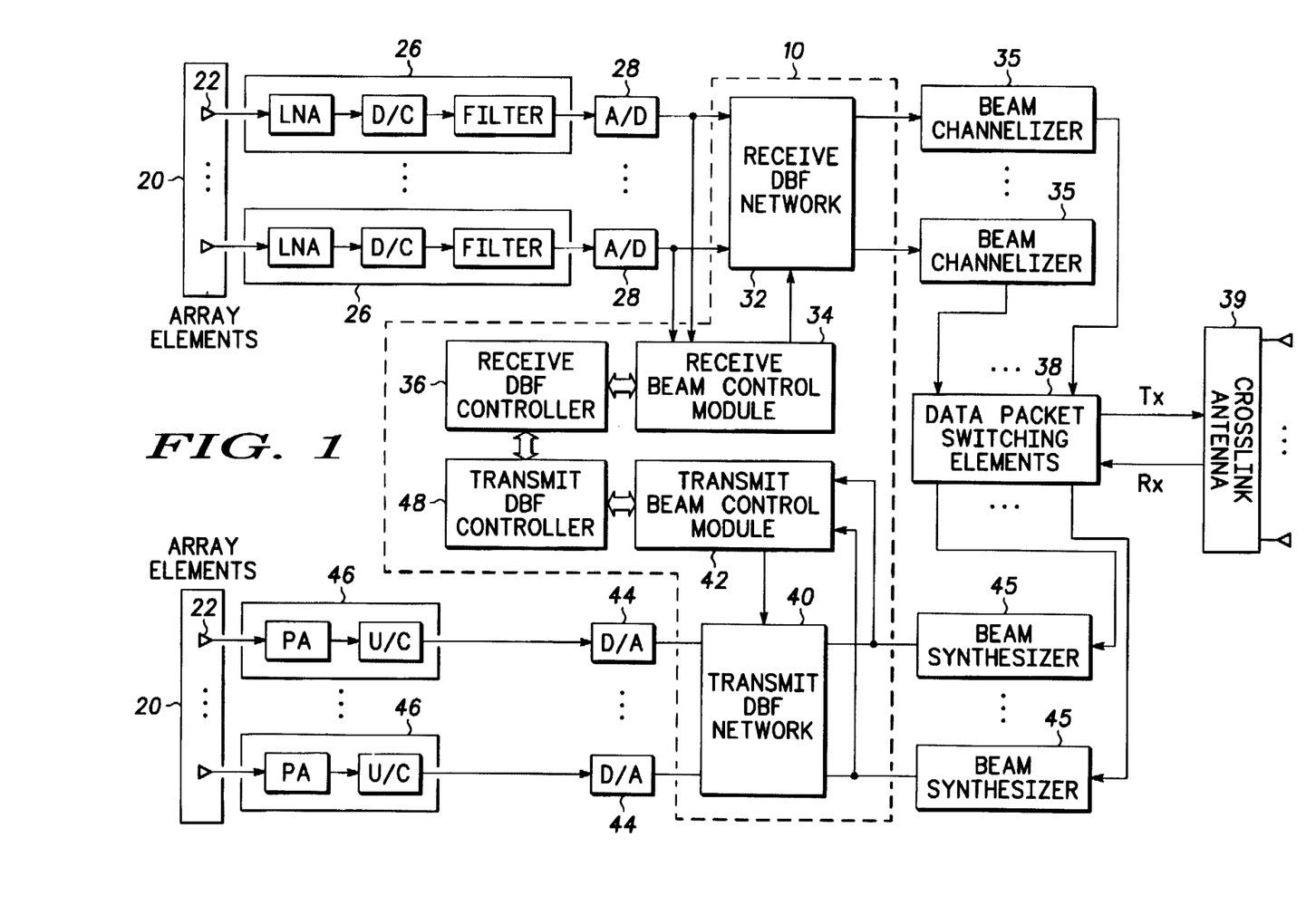
FIG. 1 shows a block diagram of satellite receiver and transmitter portions incorporating a digital beam former in accordance with a preferred embodiment of the present invention.

FIG. 1 shows a block diagram of satellite receiver and transmitter portions incorporating a digital beam former in accordance with a preferred embodiment of the present invention. Digital beam former 10 includes a receive digital beam forming (DBF) network 32, receive beam control module 34, receive DBF controller 36, transmit DBF network 40, transmit beam control module 42 and transmit DBF controller 48. The receiver portions include receive portion of array-antenna 20, one or more receiver modules 26, and one or more analog-to-digital (A/D) converters 28.

Beam former 10 implements beams steering and control functions necessary to form antenna beams with the desired characteristics. The digital outputs that beam former 10 provides to each beam channelizer 35 are preferably equivalent to the output of either a signal single antenna beam. These digital outputs are routed through the packet switching elements to either appropriate cross-link or down-link communication paths. In the case of down-links the process is reversed.

The transmit digital beam forming network 40 applies the appropriate beam steering and beam control vectors to each of these signals forming down-link beams with the prescribed characteristics. These baseband signals are converted back to analog signals and translated to down-link frequencies. Power amplifiers preferably drive each of the individual array elements. The transmitter portion includes one or more digital-to-analog (D/A) converters 44, one or more transmitter modules 46, and transmit portion of array-antenna 20.

The array-antenna 20 includes elements 22 preferably arranged in a two-dimensional array, however other array configurations are suitable. Received radio frequency (RF) signals are detected and digitized at the element level. In the absence of fading, the received signals have generally equal amplitudes, but different phases at each element. The signals can represent any number of communication channels.

In response to the received signals, the receiver modules 26 generate analog signals. The receiver modules 26 perform the functions of frequency down-conversion, filtering, and amplification to a power level commensurate with the A/D converter 28. The phase information of the radiated signals is preserved via an in-phase (I) and quadrature (Q) component included in the analog signal. The I and Q components respectively represent real and imaginary parts of the complex analog signal. There is preferably a one-to-one correspondence between the elements 22 and receiver modules 26.

The A/D converters 28 sample and digitize the analog signals to produce digital signals. Each A/D converter is preferably dedicated to processing the signals produced by a respective array element. After the A/D conversion, the digital signals go to the receive digital beamforming network 32 which computes weighted sums representing innerproduct beams. Typically, an inner-product beam represents a single communication channel.

Weight values are passed to receive digital beamforming network 32 by the receive beam control module 34. Using a suitable algorithm, receive beam control module 34 adaptively determines the proper weights for each radiating element 22. This can be done a relatively slow rate compared to the overall data throughput of the antenna system. Receive DBF controller 36 analyzes incoming signals and performs procedures and processes discussed below.

Receive DBF network 32 provides digital signals received from each radiating element 22 to beam channelizers 35. The digital signals includes amplitude and phase information (I and Q) from the radiating elements. Each beam channelizer module converts these digital signals to a digital data stream for one particular antenna beam or channel. Preferably, each channelizer module corresponds with one antenna beam. Beam channelizer modules 35 provide this digital data stream to data packet switching elements 38 from which the data is packetized and the packets are routed accordingly. In the preferred embodiment, the data packets are routed over crosslinks antennas 39 to other satellites, over downlinks to gateways or earth terminals, or over downlinks provided by the satellite to communication terminals. Preferably, array-antenna 20 provides both uplinks and downlinks for the communication terminals.

Incoming de-packetized data from data packet switching elements 38 are provided to beam synthesizer modules 45. Data packet switching elements 38 provide a digital data stream representing one individual antenna beam to each beam synthesizer module 45. The incoming digital signals preferably include phase information (I and Q components) for each channel/antenna beam. Beam synthesizer modules 45 convert this digital data stream to a digital output signal that represents the analog waveforms for each transmit radiating element 22. Each beam synthesizer module 45 provides its digital output signal to both transmit digital beam forming network 40 and the transmit beam control module 42. Transmit beam control module 42 provides weighted sums to transmit digital beam forming network 40. Preferably, a weighted sum is provided to correspond with each of the transmit radiating elements 22 of the array-antenna 20.

The weights are passed to the digital beam forming network 40 by transmit beam control module 42. Using a suitable algorithm, the transmit beam control module 42 adaptively determines the proper weights.

D/A converters 44 convert the digital output signals for each radiating element of the beam forming network 40 into corresponding analog signals for each radiating element 22. Transmitter modules 46 generate signals suitable for transmission by the radiating elements and preferably perform the functions of frequency up-conversion, filtering, and amplification.

The digital beam forming antenna system shown in FIG. 1 has advantages over conventional fixed beam antennas because it may, among other things, separate closely spaced users, adaptively adjust beam patterns in response to incoming data, provide antenna beams to individual users, provide antenna beams in response to demand for communication services and improve pattern nulling of unwanted RF signals. These features are implemented through appropriate software embedded in controllers 36 and 48.

Figure 2:
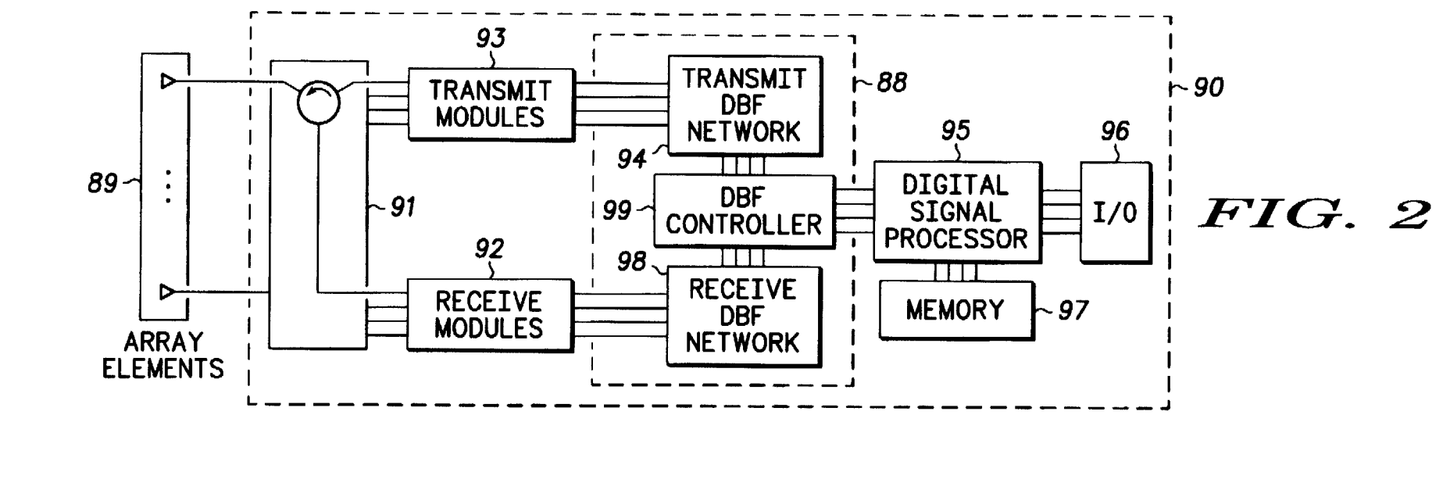
FIG. 2 shows a block diagram of a ground terminal and an array antenna including a digital beam former in accordance with the preferred embodiment of the present invention.

FIG. 2 shows a block diagram of a communication terminal and an array antenna including a digital beam former in accordance with the preferred embodiment of the present invention. Communication terminal 90 may be a mobile terminal, a ground station, a relay station or a communication terminal such as a mobile or cellular telephone, and may be mobile or fixed in location. Communication terminal 90 may also be on board an aircraft. Communication terminal 90 is coupled to array antenna 89. Array antenna 89 is comprised of a plurality of radiating elements, preferably arranged in a two-dimensional array configuration. Each array element preferably provides for reception and/or transmission of a RF signals. Because of the properties of antennas, the description herein is equally suitable to transmission and reception.

Communication terminal 90 includes isolators 91, which separate the received and transmitted signals from array antenna 89. Isolators 91 provide a transmit signal from transmit modules 93 for each array element. Isolators 91 provide received signals from each array element to receive modules 92. Ground terminal 90 also includes a digital beam former 10 (DBF) which preferably includes transmit digital beam forming network 94, receive digital beam former network 98 and digital beam former controller 99. Transmit digital beam forming network 94 receives beam forming coefficients from DBF controller 99 which control the phase and amplitude components of the transmitted RF signals at each radiating element of array antenna 89. Receive digital beam forming network 98 receives beam forming coefficients from DBF controller 99 to provide for phase and amplitude adjustment of the received RF signals from the array elements or array antenna 89.

Transmit modules 93 are similar to and perform similar functions to transmit modules 46 of FIG. 1. Receive modules 92 are similar to and perform similar functions as receiver modules 26 of FIG. 1. Transmit modules 93 convert I and Q digital signals received from transmit digital beam forming network 94 to analog signals while receive modules 92 convert analog signals to I and Q digital signals and provide these I and Q digital signals to receive digital beam forming network 98. Receive digital beam forming network 98 provides a channelized output digital signal to digital signal processor (DSP) 95 which represents the communication channel signal on which the ground terminal is communicating. In one embodiment of the present invention, ground terminal 90 may communicate on several channels at the same time. Accordingly, receive digital beam forming network 98 provides a signal for each communication channel to DSP 95.

In this embodiment DSP 95 also provides a communication channel signal to transmit digital beam forming network 94 for each communication channel the ground terminal communicates on. In the case of a cellular telephone or mobile telephone that communicates on one communication channel, receive DBF provides one communication channel to DSP 95 while DSP 95 provides one transmit communication channel to transmit digital beam forming network 94. There is no requirement that the transmit and receive communication channels be the same. DSP 95 in conjunction with Input/Output section (I/O) and in conjunction with memory element 97 provide all the standard functions associated with operating mobile terminal ground stations, communication terminals such as subscriber units, or cellular telephones. In general array elements or array antenna 89, transmit and receive digital beam forming networks 94 and 98 and DBF controller 99 are similar to the respective elements of FIG. 1. Communication terminal 90 is preferably configured to communicate using time-division multiple access (TDMA), frequency-division multiple access (FDMA) or code-division multiple access (CDMA) methods.

In the case of a subscriber unit, less array elements are required than in a satellite phase array antenna. Accordingly, the received DBF and transmit DBF modules have less elements associated therewith. For example, in the satellite phased array antenna of FIG. 1, a preferred embodiment of the preferred invention uses 64 sets of 8×8 radiating elements. These 4096 radiating elements preferably use 4096 associated receiver modules 26 and transmitter modules 46. Accordingly, 4096 analog to digital (A to D) or digital to analog (D to A) converters 28 and 44 are also used. Each A to D converter preferably provides 16 I bits and 16 Q bits of data. Receive DBF network has 4096 times 16 inputs from the A to D converters. The number of I and Q bits, may be more or less than 16 and the number of radiating elements depends on several factors, including the link margin, signal to noise ratio and antenna beam characteristics. For example, in subscriber unit and mobile and cellular telephone applications, the number of radiating elements may be between 8 and a few hundred. While for mobile and ground terminals that handle many different communication channels through many different antenna beams the number of radiating elements may be several hundred to several thousand. The communication terminal of FIG. 2, communicate with a satellite or other communication station, or another subscriber unit or commmunication terminal through the use of digital beam former 88.

Digital beam former 88 includes transmit digital beam forming network 94, receive digital beam forming network 98 and digital beam forming controller 99. Digital beam former 88 has similar functionality and includes similar hardware elements as digital beam former 10 of FIG. 1.

Through the use of digital beam former 88 embodied in subscriber unit or communication terminal 90 of FIG. 2, communication terminal 90 in one embodiment of the present invention tracks interfering signals and provides a null in its antenna pattern in the direction of the interfering signal. For example, when the ground station communicates with geostationary satellites, an interfering signal may result from a low Earth orbit satellite moving across the sky. Terminal 90 also tracks, in another embodiment of the present invention, other interfering signals and provides for nulling the antenna pattern in the direction of those interfering signals. In another embodiment of the present invention communication terminal 90, attempts to improve its receipt of incoming signals by adjusting its receiver DBF coefficients for improved signal qualities such as signal to noise ratio or carrier to noise plus interference ratio.

In another embodiment of the present invention, communication terminal 90 receives a link quality indicator from a communication station or satellite (or another communication terminal) that it is communicating with. The link quality indicator (LQI) provides preferably 3 data bits indicating of the quality of the signal received at the satellite receiver or ground base station receiver. This link quality indicator is provided back to the ground terminal or subscriber unit which accordingly adjusts its transmit digital beam forming coefficients dynamically to improve the quality of its transmitted signal. In this embodiment DSP 95 evaluates the link quality indicator and directs DBF controller 99 to adjust the beam forming coefficient provided to transmit digital beam forming network 94. In general this causes the transmit and receive antenna beam characteristics to be more optimized for the particular situation the subscriber unit or communication terminal is currently experiencing. The situation includes interference characteristics from other signals, interference characteristics caused by ground terrain and the specific receiver antenna characteristics of the receiving base station and/or satellite.

In another embodiment of the present invention the subscriber unit and/or communication terminal 90 tracks the communication signal from the base station and satellite as the subscriber unit or ground terminal moves. For example mobile subscriber units track the direction of the ground station or satellite which they are communicating with. This tracking is done by one of a variety of ways including using the receive signal and analyzing the angle or direction of arrival of the receipt signal. Alternatively, as the subscriber unit moves, the antenna beams, preferably both transmit and receive, are continually adjusted to help improve signal quality. Accordingly, the resulting antenna beam patterns are directed towards the communication station, while nulls are directed toward any interfering signal source. In one embodiment of the present invention, the subscriber unit is adapted for communicating with satellites and in non-geostationary orbit such as satellites in a low Earth orbit. As the satellite passes overhead, the antenna beam characteristics, through the use of the digital beam former 88, are adjusted to maintain improved communication with the low Earth orbit satellite and preferably remain directed towards the satellite as the satellite moves across the sky.

An example of the subscriber unit and antenna array 89 of FIG. 2 would include array elements mounted on a roof of a motorized vehicle coupled to communication terminal 90 located inside the vehicle. In the case of ground terminal, array elements may be mounted on the roof of a house or building and the ground terminal may be located elsewhere.

Figure 3:
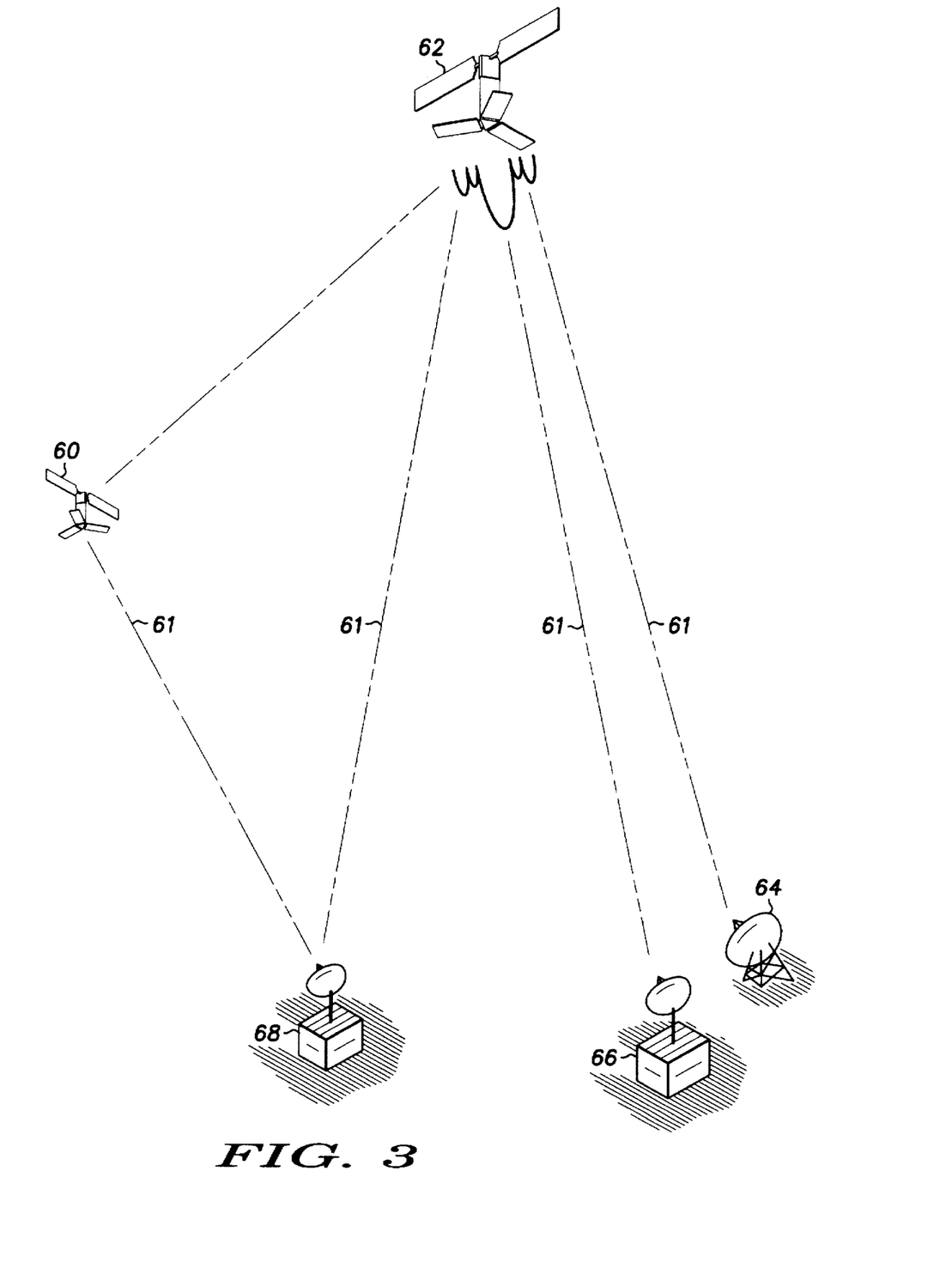
FIG. 3 illustrates a geostationary satellite using a digital beam former in accordance with a preferred embodiment of the present invention sharing spectrum with a non-geostationary satellite.

FIG. 3 illustrates a geostationary satellite with a digital beam former in accordance with a preferred embodiment of the present invention sharing spectrum with a non-geostationary satellite. FIG. 3 illustrates a typical spectrum sharing scenario in which the present invention may be used. As illustrated, there are several line-of-sight paths between geostationary (GSO) satellite 62 and non-geostationary (NGSO) satellite 60, NGSO terminal 68, GSO ground terminal 66 and an interfering signal source 64. Because NGSO satellite 60 is not fixed in relation to Earth's surface, NGSO satellite may come into view at various time. If the two communication systems occupy a common segment of the frequency spectrum, interference between the two systems may occur.

When GSO satellite 62 employs a digital beam former of the present invention, the receiver portion of the digital beam former configures the antenna beams of GSO satellite to desirably point its main communication beam at the ground GSO terminal 66 while preferably providing a null in the antenna pattern in the direction of NGSO ground terminal 68. Accordingly, any interference from the NGSO ground terminal 68 is significantly reduced. Preferably another null in the antenna pattern of GSO satellite 62 is directed toward and tracks NGSO satellite 60. To accomplish this, DBF receive and/or transmit coefficients are continually adjusted to maintain a null in the direction of the NGSO satellite 60 as the NGSO satellite 60 moves. Accordingly, these nulls are dynamically controlled.

Nulls are placed in the antenna pattern directed towards NGSO terminal 68. NGSO terminal 68 usually transmits and receives at a time only when NGSO satellite is overhead. Accordingly the null in the transmit and receive antenna patterns of GSO satellite 62 may be turned on and turned off in accordance with NGSO terminal 68. The positioning of a null in the receive and transmit antenna patterns of GSO satellite 62 allows the two systems to share spectrums. In the preferred embodiment of the present invention, transmit and receive nulls are placed in similar directions. The direction information is preferably shared between received DBF controller 36 and transmit DBF controller 48 of FIG. 1.

In one preferred embodiment, the direction to direct the antenna null is determined using direction of arrival information from the interfering signal. DBF of GSO satellite 62 monitors its field of view for preferably two classes of signals, synergistic and non-synergistic. Synergistic signals are signals whose characteristics are well-known. Preferably these synergistic interfering signals are demodulated in GSO satellite 62 at baseband level and accordingly transmit and receive digital beam forming coefficients are adjusted to reduce and help minimize the receipt of this interfering signal. In the case of non-synergistic signals, i.e., signals that are unknown, basic direction of arrival techniques are used to mitigate interference from these signals.

The digital beam former of the present invention may also be employed on NGSO satellite 60 and provide nulls in the direction of GSO terminal 66 and interfering signal source 64.

One advantage to the present invention is that spectral sharing is improved for increased geostationary satellite density. For example, through the use of the digital beam former described in FIG. 1, geostationary satellites may be placed in orbital slots separated by less than 2°. For example, when a communication terminal is communicating with its assigned geostationary satellite, each of the geostationary satellite are broadcasting acquisition channel information. The communication terminal antenna receives this information from each of the satellites within view. When the acquisition channels are separable in some way, such as frequency, the ground terminal preferably receive each acquisition channel and determines the direction of arrival of each of the acquisition signals. The digital beam former, when employed in a geostationary satellite ground terminal, preferably adjusts its transmit and receive antenna beam characteristics to point its primary antenna beams at the desired geostationary satellite while directing a null in the direction of the other geostationary satellites. The direction of arrival may be determined using, among other things, information associated with the communication terminal's location.

Super resolution techniques allow the spatial resolution of these signals separate by approximately $\frac{1}{10}$th of an antenna beam width. To maintain such fine separation, high values of signal to noise ratio are desirably. Accordingly, a ground station with a suitable amount of array elements 22 (FIG. 1) provides for an acceptable signal to noise ratio and suitable antenna beam gain characteristics.

In another embodiment the present invention, the digital beam former as embodied aboard a geostationary satellite maintains antenna alignment. For example, GSO satellites slowly drift in their orbital locations. Typically, onboard station keeping is required to maintain the satellites position. As a SO satellite drifts, its antenna beams move off their intended pointing direction and various alignment techniques based on the transmission of frequency tones from the system control facility are typically used to realign the pointing direction of the satellite antennas. GSO satellite antenna systems based on reflector or lens antennas correct for these movements by physically moving the antennas or the antenna feeds. Such a technique requires that antenna components be noted on moveable structures. The digital beam former of the present invention eliminates the need for these mechanical structures. The digital beam former corrects the beam pointing direction as the geostationary satellite drifts. This correction is preferably based on the use of transmitted or received signal quality levels.

Figure 4:
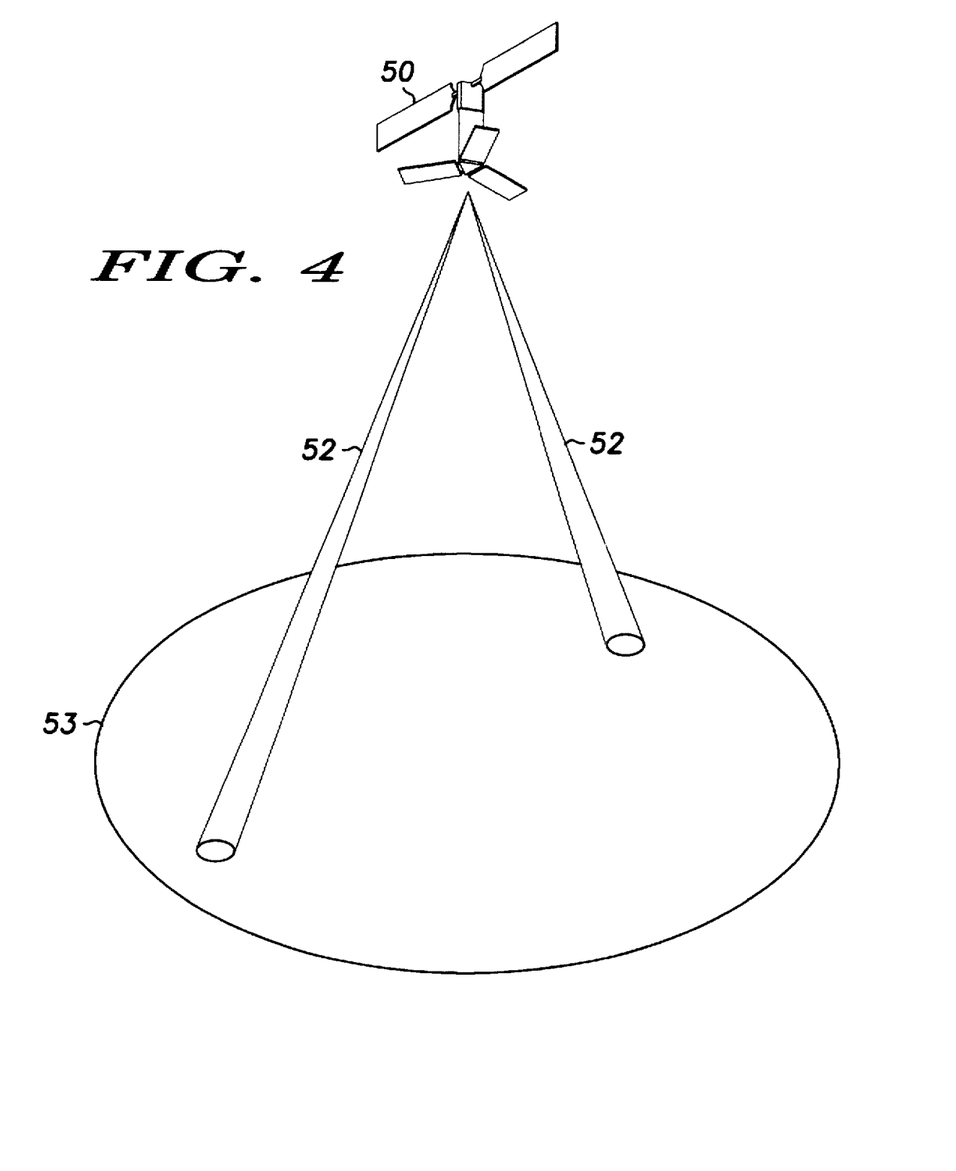
FIG. 4 illustrates a satellite providing individual antenna beams using a digital beam former in accordance with the present invention.

FIG. 4 illustrates a satellite providing individual antenna beams using a digital beam former in accordance with the present invention. Satellite 50 may be either a geostationary satellite or non-geostationary satellite. Satellite 50 has a footprint region associated therewith which is the geographic region of which satellite 50 provides communication services. Satellite 50 may cover footprint region 53 with one antenna beam for signals from within the footprint regions, including the monitoring demand for communication services, monitoring interfering and monitoring subscriber units requesting service. Satellite 50 also provides a plurality of individual antenna beams 52 within footprint region 53. A digital beam former in accordance with the present invention is configured to provide these antenna beams. Individual antenna beams 52 are provided in a variety of ways and are preferably provided to individual subscriber unit. Individual antenna beams 52 are also provided in response to demand for communication services. Individual antenna beams 52 track a subscriber unit's movement through the footprint region 53. These are described in more detail in the procedures below.

Figure 5:
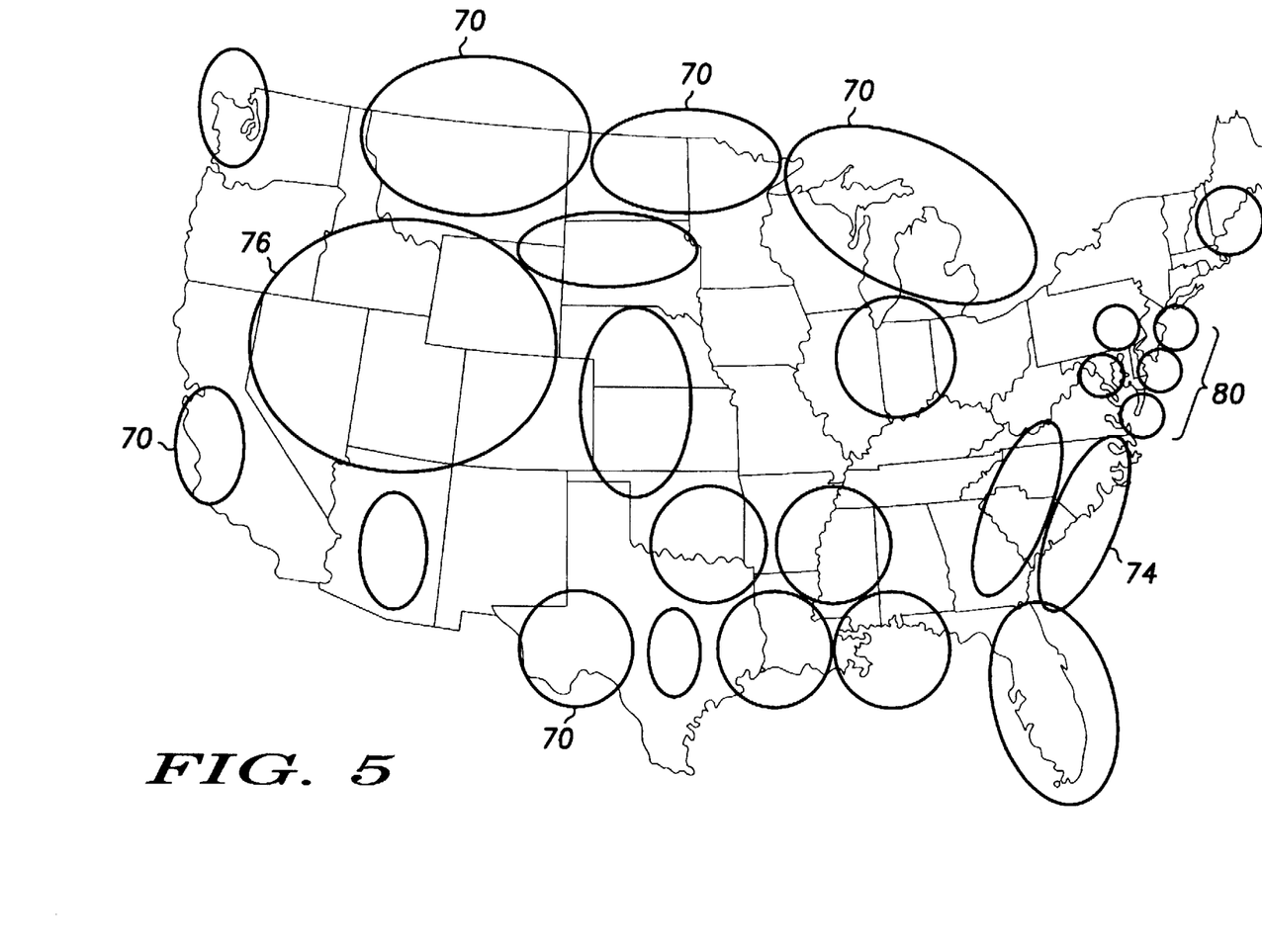
FIG. 5 illustrates antenna beam projections on earth's surface using a digital beam former in accordance with a preferred embodiment of the present invention that are responsive to demand for communication services.

FIG. 5 illustrates antenna beam projections on a portion of Earth's surface using a digital beam former in accordance with a preferred embodiment of the present invention. In this embodiment, antenna beams are provided in responsive to demand for communication services. The ability to adapt to traffic demand is very desirable in any satellite system. Digital beam former 10 of FIG. 1 provides for positioning of nulls in the antenna beam pattern and provides for beam shaping and other beam characteristics that are dynamically modified through the use of these digital beam forming techniques. In a preferred embodiment of the present invention, the digital beam former 10 provides dynamically reconfigurable antenna patterns as shown in FIG. 5. These example antenna beam patterns are based on current traffic demand levels. For example, antenna beam 74 provides broad coverage over a large region having a low demand for communication services, while antenna beams 80 are small and provide a high concentration of communication capacity in a region having high demand for communication services.

In another embodiment, antenna beams are shaped in responsive to demand for communication services. Antenna beams 74 are modified and shaped, for example, to approximate the contour of a geographic region having high demand for communication services next to an area having virtually no demand for communication services, e.g., the ocean. Accordingly, communication capacity may be concentrated where it is needed. In the preferred embodiment, antenna beam 70 are dynamically configured in real time in response to demand for communication services. However, in other embodiments of the present invention, antenna beams are provided based on historic and measured demand for communication services.

Figure 6:
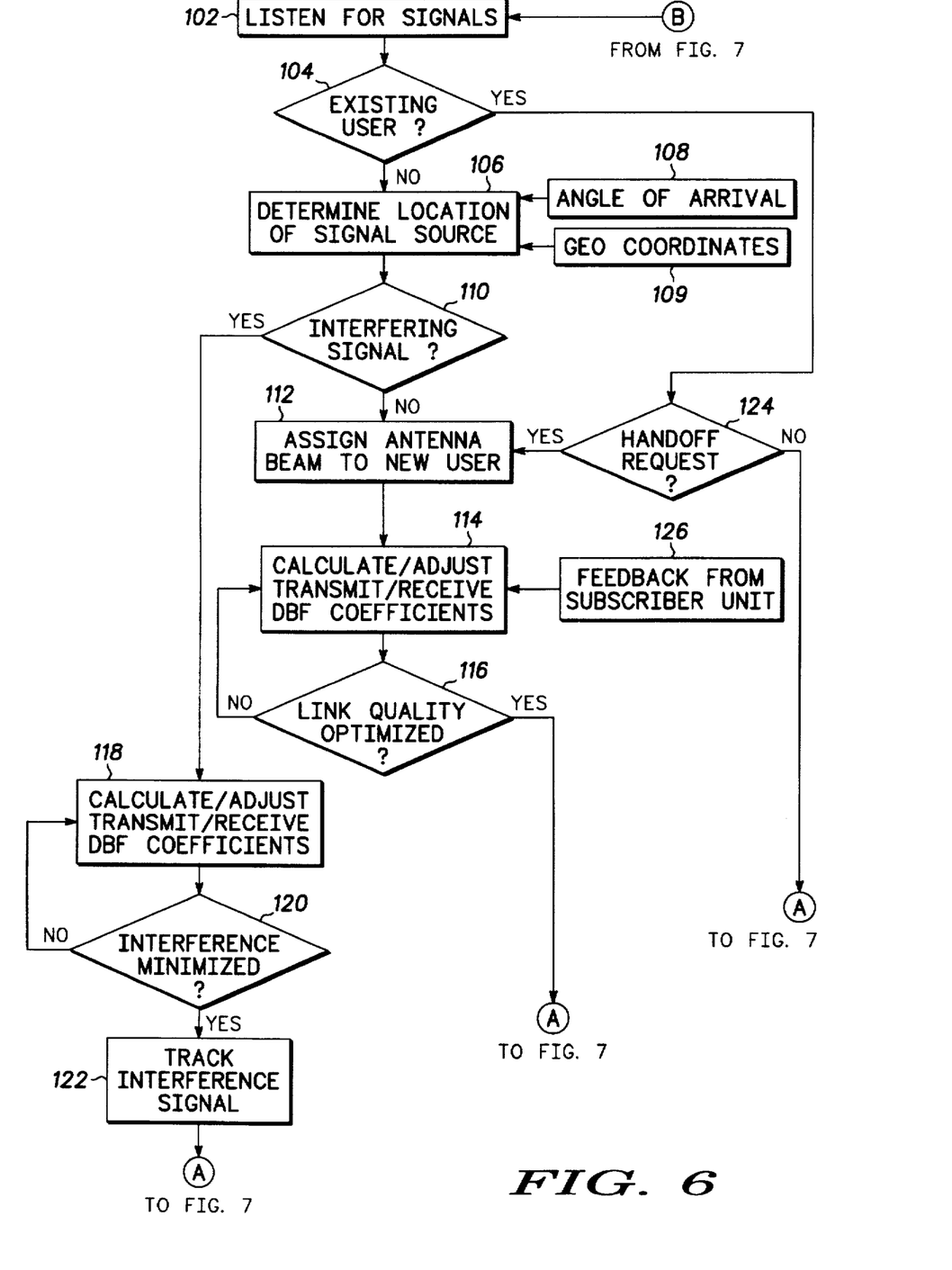
FIGS. 6 and 7 are flow charts illustrating an interference mitigation and antenna beam assignment procedure in accordance with a preferred embodiment of the present invention.
Figures 7, 8:
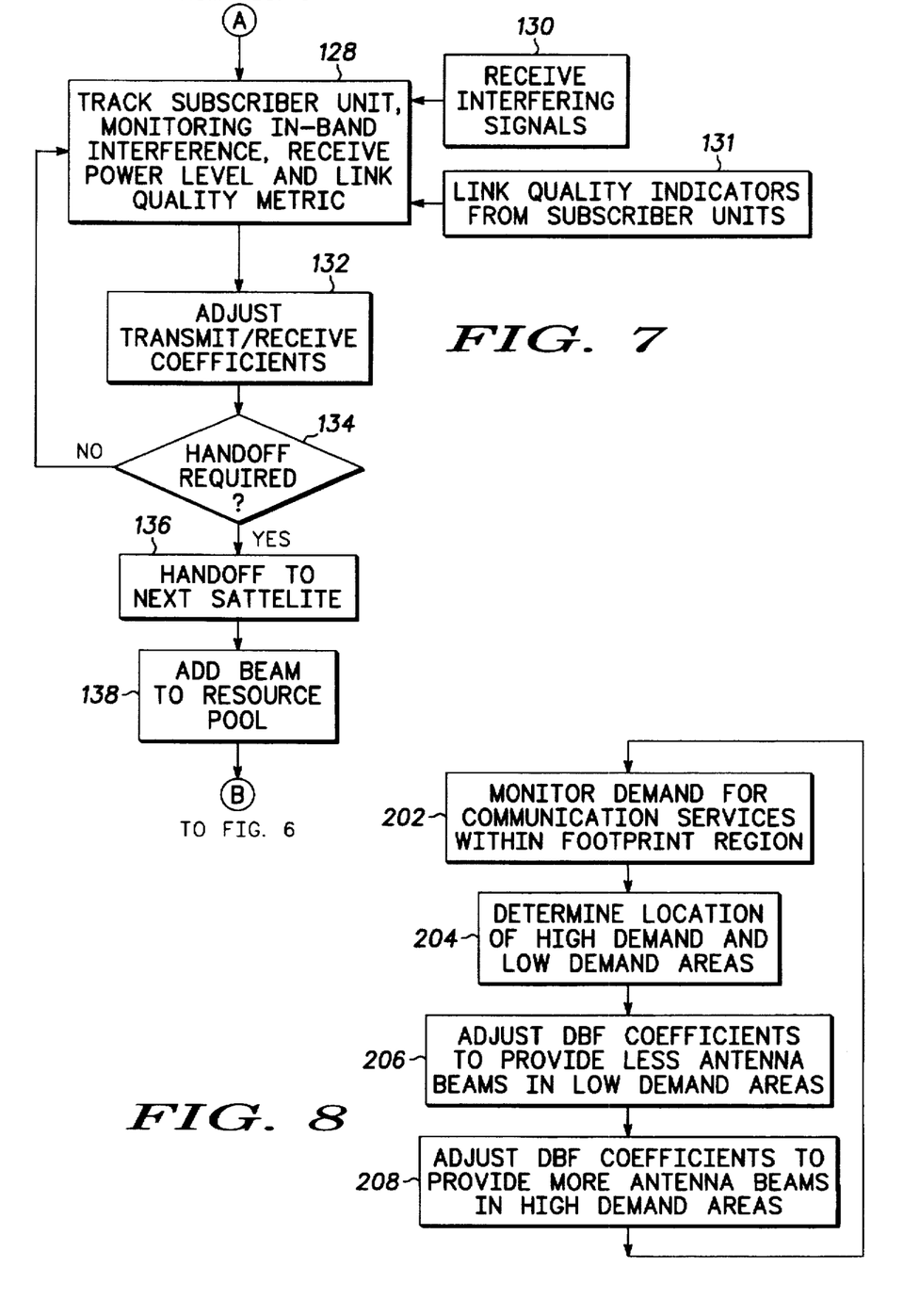
FIG. 8 is a flow chart illustrating a procedure for providing antenna beams to geographic regions in response to demand for communication services.

FIGS. 6 and 7 are flowcharts illustrating an interference mitigation and antenna beam assignment procedure in accordance with the preferred embodiment of the present invention. Procedure 100, although shown in a top down sequential flow is meant to illustrate the steps performed by digital beam former 10 of FIG. 1. Many of the tasks and steps shown are preferably performed in parallel and procedure 100 is desirably performed for many subscriber units and interfering signals concurrently. Those of skill in the art are able to write software for receive DBF controller 36 and transmit DBF controller 48 to execute the tasks of procedure 100. Preferably procedure 100 is performed by receive DBF controller 36 and transmit DBF controller 48 in conjunction with beam controller modules 34 and 42. Software is embedded within DBF controller 36, transmit DBF controller 48, and beam controller module 34 to perform the functions described herein. Portions of procedure 100 may also be performed concurrently by processors on other satellites or ground stations in conjunction with the satellite portion shown in FIG. 1. Although procedure 100 is described for communication between a satellite and a ground based subscriber unit, procedure 100 is applicable to any communication station, including relay stations and communication terminals.

In task 102, the communication station listens for signals, preferably within the satellite's footprint. Preferably, receive beam controller module 34 configures the antenna beams to provides at least one broad antenna beam covering substantially an entire satellite footprint. Accordingly, signals are received from anywhere within that footprint on that one antenna beam. Signals that are received may include signals from existing users that are already communicating with the satellite system, interfering signals, e.g., signals from non-system users including interfering signals, and signals from system users requesting access to the system.

Task 104 determines whether or not the signal is one from an existing user. In general, the location of existing users is known. If the signal received is not from an existing user, task 106 determines the location of that signal source. Those of skill in the art will recognize that various ways may be used to determine the geographic location of a signal source. Those ways may include analyzing the angle of arrival, the time of arrival, frequency of arrival, etc. Alternatively, if the signal source is a user requesting system access, that subscriber unit may provide geographic coordinates on its system access request signal.

Once the location of the signal source is determined task 110 determines whether or not the signal is an interfering signal. In other words, task 110 determines if the signal source will interfere with a portion of the spectrum assigned to the satellite system, or alternatively, if the interfering signal is a communication channel currently in use with a subscriber unit communicating with the satellite. If task 110 determines that the signal source is not an interfering signal and that the signal source is a request for a new channel, task 112 assigns an antenna beam to that user. Task 112 may employ various security and access request procedures which are not necessarily important to the present invention. In the preferred embodiment task 112 is accomplished through receive and transmit DBF controllers 36 and 48 providing the appropriate information to beam control modules 34 and 42.

Beam control modules 34 and 42 cause receive and transmit DBF network 32 and 40 to generate individual receive and transmit antenna beams directed to that subscriber unit at that subscriber units geographic location. Tasks 114 and 116 preferably, repeatedly adjust the DBF transmit and receive coefficients to help provide improved signal quality received from the subscriber unit.

In one preferred embodiment of the present invention the subscriber unit provides a link quality indicator (LQI) that indicates the quality of the received signal. The subscriber unit provides that link quality indicator to the satellite. The link quality indicator is evaluated by received DBF controller 36 and transmit DBF controller 48 causing transmit beam control module 42 to adjust DBF control coefficients to help optimize the transmitted antenna beam to the subscriber unit.

When task 110 determines that the signal source is an interfering signal, for example a non-system user, task 118 and task 120 calculate and adjust the receive DBF coefficients provided to receive DBF network 32 to help reduce or minimize interference from the interfering signal. In one embodiment of the present invention, task 118 places a "null" in the antenna pattern in the direction of the interfering signal. In the preferred embodiment tasks 118 and 120 are repeated until the interference is below a predetermined level. In task 122, the interfering signal is continually monitored and tracked as either the satellite moves or the interfering signal moves.

When task 104 has determined that the signal source is an existing user, task 124 determines when a hand-off is required. In some embodiments of the present invention the subscriber unit requests hand-offs while in other embodiments of the present invention, the system determines when a hand-off is necessary. Preferably, hand-offs are determined based on signal quality. In general, a hand-off is requested when a user is near the edge of the antenna pattern footprint region or exclusion zone.

In one preferred embodiment of the present invention, antenna beams are individually provided to the subscriber unit and the individual antenna beam tracks the location of the subscriber unit. Accordingly, hand-offs are only between satellites and necessary at the edge of the satellite footprint. When a hand-off is necessary, task 112 is executed which assigns a new antenna beam from another satellite to the user. If a hand-off is not required, task 128 is executed. In task 128, in-band interference is monitored along with received power level and link quality metrics.

In task 132, the receive and transmits DBF coefficients are adjusted to help maintain an improved or maximum signal quality, to help reduce or minimize in-band interference and to help maximize receive power level. During this "tracking" mode, additional interfering signals 130 may cause a degradation in signal quality. Accordingly, task 132 dynamically readjusts the DBF coefficients to help maintain signal quality. In one embodiment of present invention link quality indicators 131 are provided by communication terminals or subscriber units. Accordingly, the combination of tasks 128 through 132 provides for tracking of the subscriber unit as the relative location between the subscriber unit and the satellite change. Task 134 determines when a hand-off is required. If a hand-off is not required the subscriber unit remains in the tracking mode. When the hand-off is required task 136 will execute a hand-off to the next satellite. In one embodiment of the present invention the next satellite is notified that a hand-off is required and it is provided the geographic location of the subscriber unit. Accordingly, the next satellite can assign and generate an antenna beam specifically for that subscriber unit before being released from its present satellite. Once the subscriber unit is handed off to the next satellite, task 138 adds the available antenna beam to its resource pool, allowing that antenna beam to be available to be assigned to another subscriber unit.

FIG. 8 is a flowchart illustrating a procedure for providing antenna beams to geographic regions in response to demand for communication services. Procedure 200, although shown in a top down sequential flow is meant to illustrate the steps performed by digital beam performer 10 of FIG. 1. Many of the tasks and steps shown are preferably performed in parallel and procedure 200 is desirably performed for many subscriber units concurrently. Those of skill in the art are able to write software for receive DBF controllers 36 and transmit DBF controller 48 to execute the tasks of procedure 200. The tasks of procedure 200 are preferably performed on a continual basis by receive and transmit DBF controllers 36 and 48. Although procedure 200 is described for communication between a satellite and a ground based subscriber unit, procedure 200 is applicable to any communication station, including relay stations and communication terminals.

In task 202 the demand for communication services is monitored within the satellite footprint region. In the preferred embodiment, one antenna beam is used to monitor the demand throughout the entire footprint. In task 204 the location of high demand and low demand geographic regions are determined. Task 204 can be accomplished in any number of ways. For example, each subscriber unit communicating with the system has a geographic location associated therewith. Furthermore, each subscriber unit requesting access to the system may provide the system with geographic location data. Once the geographic locations of high demand and low demand areas are determined, task 206 causes the DBF beam control modules to provide less antenna beams in low demand areas and provide more antenna beams in high demand areas. In one embodiment of the present invention, each antenna beam provides a limited amount of communication capacity.

Referring to FIG. 5, lower demand areas are provided with antenna beams having a much larger coverage region than antenna beams being provided to high demand areas. For example, antenna beam 74 of FIG. 5 covers a large geographic region that currently has a low demand for communication services. Alternatively, antenna beams 80 have much smaller geographic coverage regions and provide more communication capacity for a region that currently has a high demand for communication services. In another embodiment of the present invention tasks 206 and 208 adjust the shape of the antenna beams based on the demand for communication services. For example, in reference to FIG. 5, antenna beams 74 are long narrow beams formed to provide better area coverage for communication services. For example, coastal regions are provided narrow beams to reduce communication capacity over the ocean where significantly less communication capacity is required. In this embodiment, antenna beams 74 are preferably shaped dynamically in response to demand for communication services.

As the demand for communication services changes, antenna beams 70 are dynamically provided in response. For example, FIG. 5 shows a continental view of the United States communication services. As the day begins, antenna beams are initially provided along the East Coast of the United States. As the day progresses, the antenna beams transition across the country as the time of day changes in response to demand for communication services. In the case of a natural disaster where demand for communication services may be particularly great, dedicated antenna beams may be provided. A satellite control facility may direct satellite's digital beam former 10 to allocate beams accordingly. In general, antenna beams 70 preferably are provided in response to the changing demand of communication services without the assistance of operators.

Figure 9:
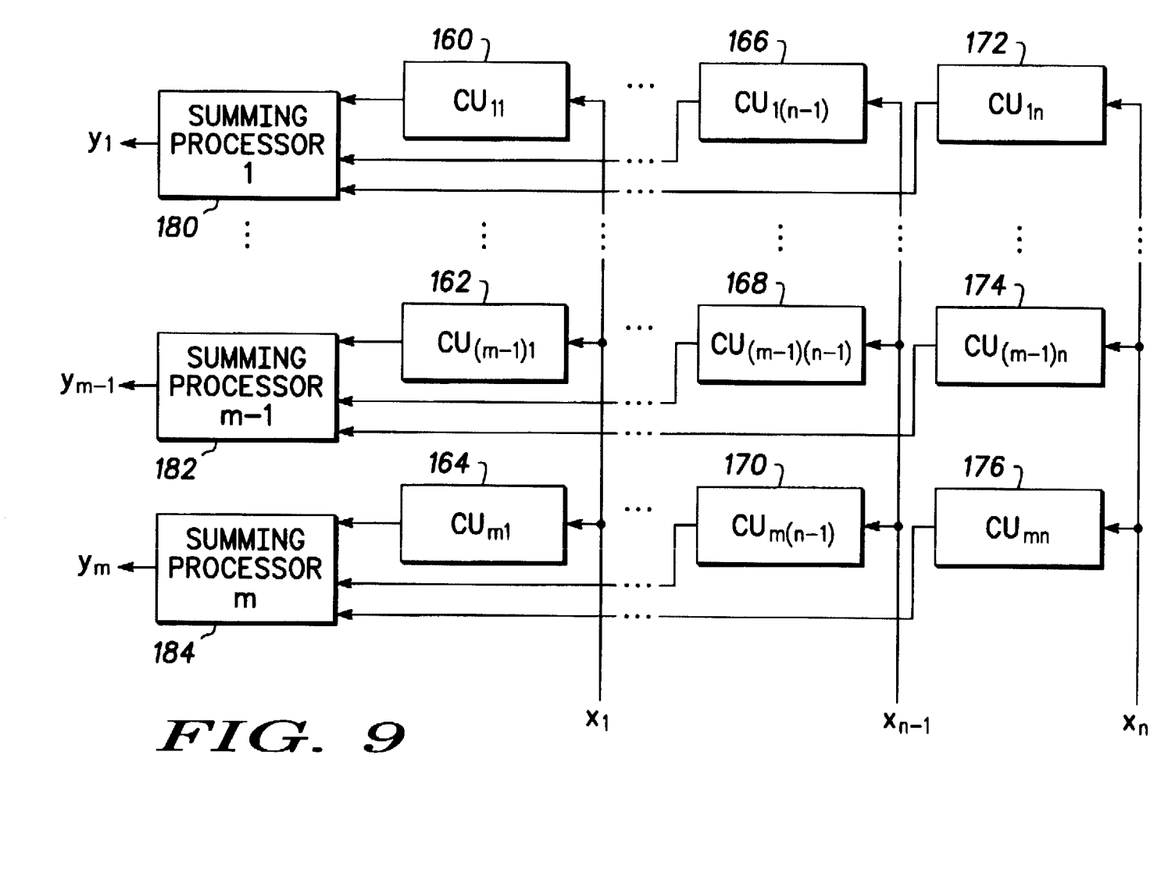
FIG. 9 shows a block diagram of a digital beam former in accordance with a preferred embodiment of the present invention.

FIG. 9 shows a block diagram of the digital beam former according to an embodiment of the present invention. The beam former includes a plurality of computing units (CU's) 160–176 and a plurality of summing processors 180–184. The computing units 160–176 form a processor array. Each column in the processor array receives a corresponding digital signal. Upon receiving a digital signal, each computing unit independently weights the signal to generate a weighted signal. The summing processors 180–184 provide a means for summing weighted signals generated by a respective row to produce outputs. Essentially, each output signal represents a weighted sum. The architecture of the digital beam former lends itself to high-speed, parallel computation of discrete Fourier transforms.

Figure 10:
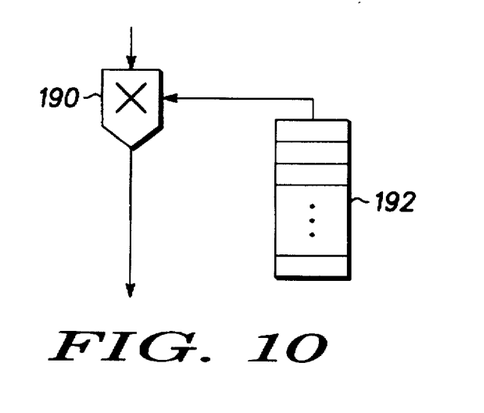
FIG. 10 shows a block diagram representing a first embodiment of a computing unit suitable for use in the digital beam former of the preferred embodiment of the present invention.

FIG. 10 shows a block diagram representing a first embodiment of a computing unit usable in the digital beam former of FIG. 9. The computing unit includes a multiplier 190 and a memory circuit 192. The computing unit weights an incoming digital signal by multiplying it by a pre-computed weight value stored in the memory circuit 192. The output of the multiplier 190 represents the weighted signal.

The memory circuit 192 can be any means for storing values whose contents is up-datable by the digital beam control modules 34, 42 (FIG. 1), such as a ROM (read only memory), EEPROM (electrically erasable programmable read only memory), DRAM (dynamic random access memory), or SRAM (static random access memory).

Figure 11:
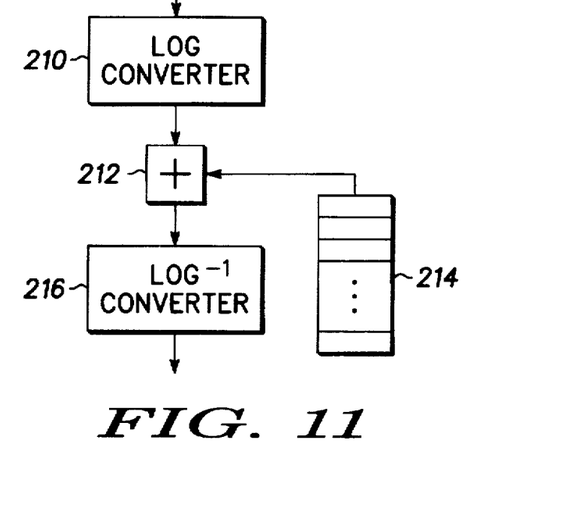
FIG. 11 shows a block diagram representing a second embodiment of a computing unit suitable for use in the digital beam former of the preferred embodiment of the present invention.

FIG. 11 shows a block diagram representing a second embodiment of a computing unit usable in the digital beam former of FIG 9. In this embodiment of the computing unit, an incoming signal is weighted using logarithmic number system (LNS) arithmetic. LNS-based arithmetic provides advantages because multiplication operations can be accomplished with adders instead of multipliers. Digital adder circuits tend to be much smaller than comparable multiplier circuits, thus, the size the beam forming processor array can be reduced by incorporating LNS-based computing units.

The LNS-based computing unit includes a log converter 210, an adder 212, a memory circuit 214, and an inverse-log ($\log^{-1}$) converter 216. An incoming signal is first converted to its respective log signal by the log converter 210. The adder 212 then sums the log signal and a logged weight value from the memory circuit 214 to produce a sum. The sum is then converted to the weighted signal by the inverse-log converter 216.

The log converter 210 and inverse-log converter 216 can be implemented using any of the converters described in the co-pending U.S. patent applications of above-identified Related Applications Nos. 1–4.

Figure 12:
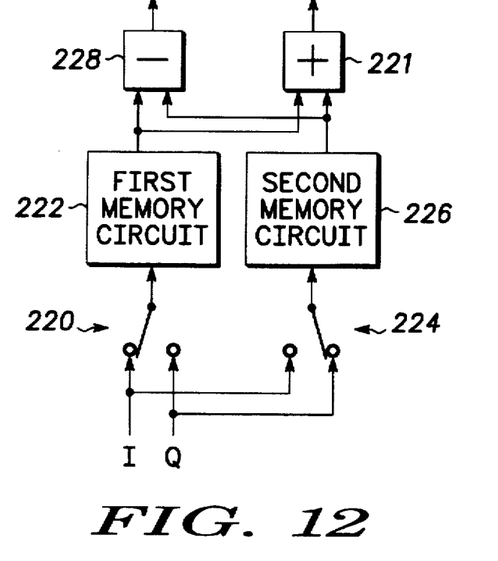
FIG. 12 shows a block diagram representing a third embodiment of a computing unit suitable for use in the digital beam former of the preferred embodiment of the present invention.

FIG. 12 shows a block diagram representing a third embodiment of a computing unit usable in the digital beam former of FIG. 9. This embodiment of the computing unit is intended to weight complex signals. In many applications, the I and Q components of the complex digital signals are represented by a pair of 3-bit words. Although it is not limited to small word lengths, the computing unit of FIG. 12 provides advantage in such applications because it requires less power and space when implemented using an integrated circuit.

The computing unit includes a first switch 220, a first memory circuit 222, a second switch 224, a second memory circuit 226, a subtractor 228, and an adder 221. The first memory 222 stores first pre-computed values that are based on an imaginary weight. The second memory 226 stores second pre-computed values that are based on a real weight. The purpose of the computing unit is to multiply these two complex numbers. The first memory 222 stores the pre-computed values I and Q for the imaginary weight, while the second memory 226 stores the pre-computed values I and Q for the real weight. It will be apparent to one of ordinary skill in the art that using 3-bit words to represent the complex components and weights would require each memory to store eight 6-bit words.

The first switch 220 provides a means for addressing the first memory circuit using either the I or Q component to select one of the first pre-computed values as the first memory circuit output. The second switch 224 provides a means for addressing the second memory 226 using either the I or Q component to select one of the second pre-computed values as the second memory circuit output.

The subtractor 228 subtracts the first memory output from the second memory output to generate the weighted in-phase component that is then included in the weighted signal. The adder 221 sums the first memory output and the second memory output to generate the weighted quadrature component that is also included in the weighted signal.

In one embodiment of the computing unit, the subtractor 228 includes an adder capable of summing 2s-complement numbers. The pre-computed values are either stored in the memory as 2s-complement values or additional logic circuitry is placed in the computing unit to convert the pre-computed values to their respective 2s-complement values.

Preferably, the subtractor 228 includes an adder having a carry input set to one and inverters to form the 1s-complement value of the second memory output. The adder effectively utilizes the 2s-complement value of the second memory output by summing the carry input and the 1s-complement value.

Figure 13:
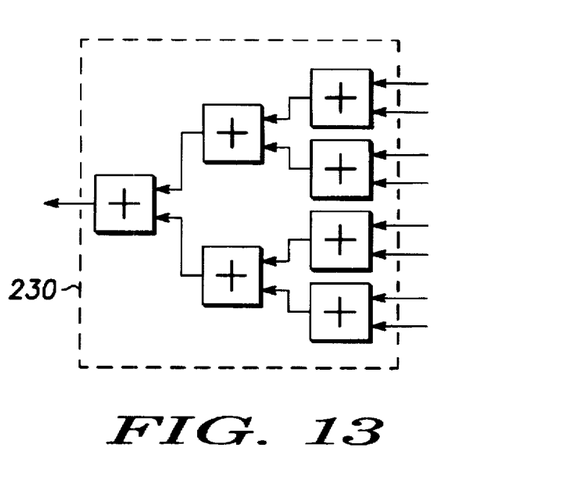
FIG. 13 shows a block diagram representing a first embodiment of a summing processor suitable for use in the digital beam former of the preferred embodiment of the present invention.

FIG. 13 shows a block diagram representing a first embodiment of a summing processor that is usable in the digital beam former of FIG. 9. This particular embodiment of the comprises an adder tree 230. The adder tree 230 includes adders which are connected together in a fashion which allows three or more input signals to be summed concurrently. When using the adder tree topology depicted by FIG. 13, N–1 adders are required to sum N inputs. Regarding the example shown in FIG. 13, eight input signals can be received simultaneously, thus, seven adders are required in the adder tree 230. If one wishes to sum a greater number of input signals, more adders are required. For instance, in order to sum 128 input signals, the adder tree would require 127 adders. The adder tree 230 has advantage because it presents less of a delay in providing output sums.

Figure 14:
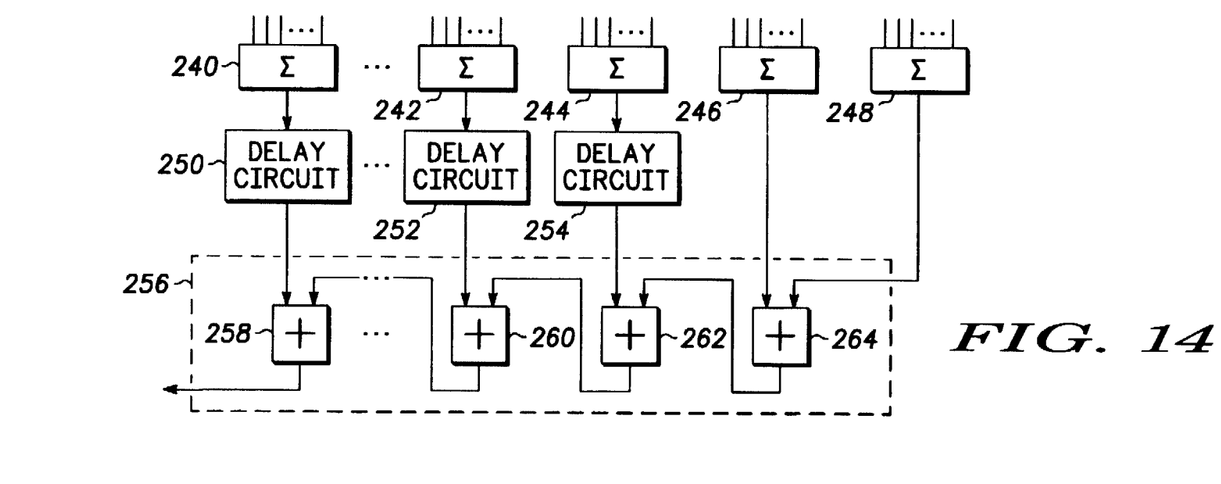
FIG. 14 shows a block diagram representing a second embodiment of a summing processor suitable for use in the digital beam former of the preferred embodiment of the present invention.

FIG. 14 shows a block diagram representing a second embodiment of a summing processor that is usable in the digital beam former of FIG. 9. This summing processor embodiment includes a plurality of summers 240–248, a plurality of delay circuits 250–254, and a ripple adder 256. Although this summing processor topology may require more time to generate a final sum than a comparable adder tree, it requires less area when implemented in an integrated circuit.

Each of the summers 240–248 sums weighted signals from a group of computing units residing in a same row to produce a weighted sum signal. A summer can include any means for summing weighted signals, such as an adder tree or an accumulator that sequentially adds inputs.

The delay circuits 250–254 produce delayed signals by buffering the weighted sum signals for a predetermined time. Generally, the weighted signals are produced at the summer outputs at approximately the same time. In order to correctly sum the weighted signals, it is necessary to delay weighted signals that are generated in the downstream portion of a processor row. The delay time is a function of the location of the group of computing units within the processor columns.

The ripple adder 256 includes two or more adders 258–264 cascaded together in order to sum the delayed signals and first two weighted sums. The output of the ripple adder 256 represents the total sum of all weighted signals in a given processor row.

Figure 15:
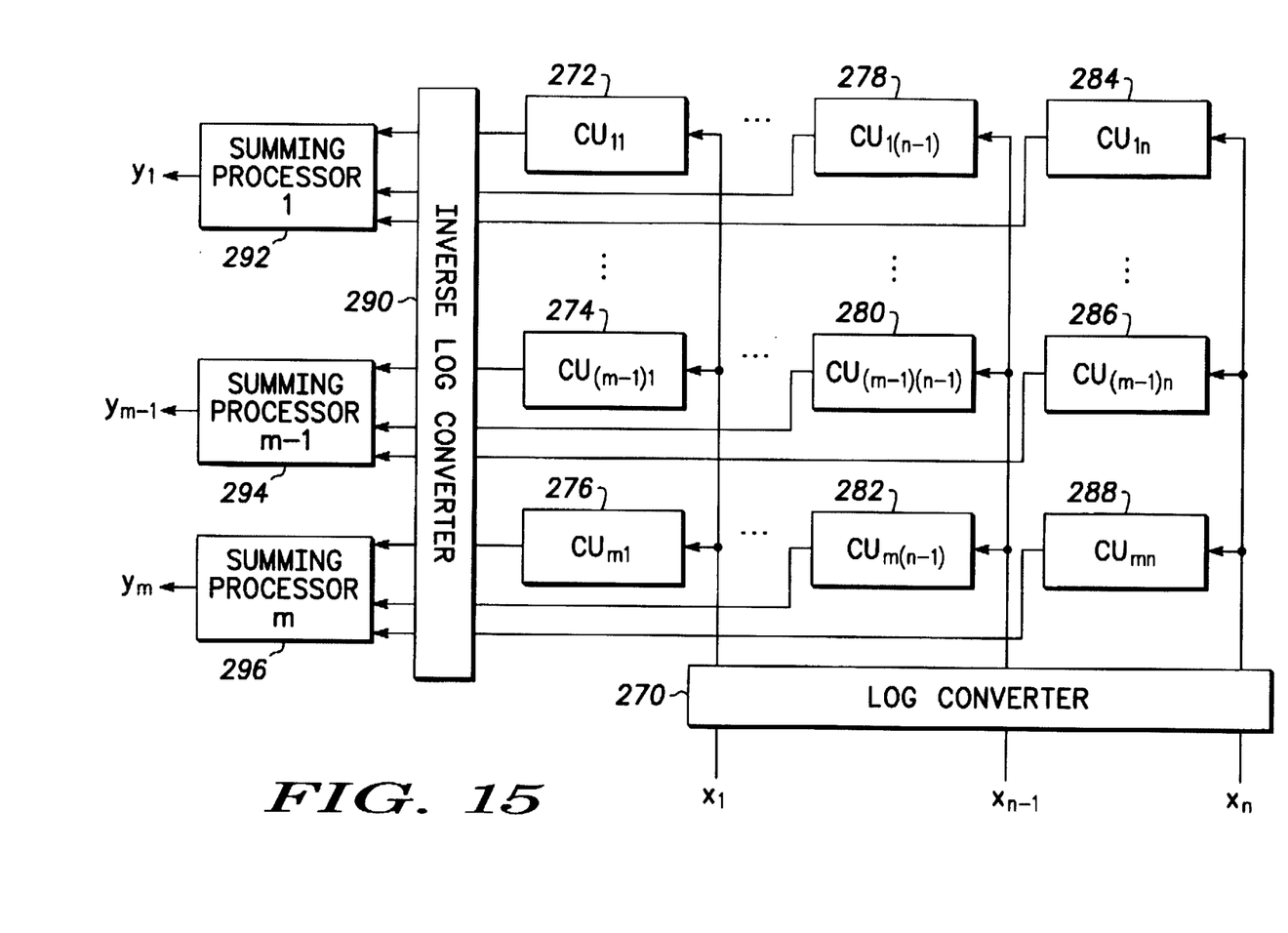
FIG. 15 shows a block diagram of a digital beam former that is in accordance with a second embodiment of the present invention.

FIG. 15 shows a block diagram of a digital beam former that is in accordance with a second embodiment of the present invention. This embodiment of the beam former includes a log converter 270, a plurality of computing units 272–288, an inverse-log converter 290, and a plurality of summing processors 292–296. The computing units 272–288 form a processor array. Incoming digital signals are first converted to log signals by the log converter 270. Each column in the processor array receives a corresponding log signal. Upon receiving a log signal, each computing unit independently weights the signal to generate a sum signal. The sum signals are then converted to weighted signals by the inverse-log converter 290. For each processor row, the weighted signals are respectively summed by one of the summing processors 292–296 to generate an output signal.

The log converter 270 and inverse-log converter 290 can be implemented using any of the converters described in the co-pending U.S. patent applications identified above. Although the approach is described in the I and Q domain, similar techniques are equally applicable to the polar domain.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of communicating with ground based communication stations using a satellite based array antenna adapted to operate with a digital beam former (DBF), said array antenna having a plurality of radiating elements for providing steerable antenna beams within a footprint region, said DBF providing for each radiating element, coefficients for controlling characteristics of said steerable antenna beams, said method comprising the steps of:

determining geographic portions of said footprint region having a higher demand for communication services;

determining geographic portions of said footprint region having a lower demand for communication services; and adjusting said coefficients to provide a greater number of antenna beams to said geographic portions having said higher demand for communication services than to said geographic portions having said lower demand for communication services.

2. A method as claimed in claim 1 wherein the determining steps comprise the step of monitoring a real-time demand for communication services in different geographic portions of said footprint region, and wherein the method further comprises the steps of:

repeating the monitoring step, the determining steps and the adjusting step as said real-time demand for communication services changes;

re-adjusting said coefficients to provide additional antenna beams to geographic portions in response to increases in said real-time demand for communication services; and re-adjusting said coefficients to remove antenna beams in geographic portions in response a decrease in said real-time demand for communication services.

3. A method as claimed in claim 2 further comprising the steps of:

re-adjusting said coefficients to provide antenna beams having small coverage regions to said geographic portions having said higher demand for communication services; and re-adjusting said coefficients to provide antenna beams having large coverage regions to said geographic portions having said lower demand for communication services.

4. A method as claimed in claim 3 wherein said antenna array is adapted for location on a geostationary satellite and wherein said footprint region has an identified geographic portion therein having a predetermined higher demand for communication services, said identified geographic portion having a shape associated therewith, said method further comprises the step of adjusting said coefficients to provide an antenna beam shaped to substantially cover said identified geographic portion.

5. A method as claimed in claim 3 wherein said array antenna is adapted for location on a non-geostationary satellite having movement with respect to earth's surface, said method further comprising the steps of:

adjusting said coefficients as said satellite moves to maintain said greater number of antenna beams for said geographic portions having said higher demand for communication services.

6. A method as claimed in claim 3 further comprising the steps of:

converting communication signals received by each of said radiating elements to digital I and Q signals; and using said coefficients to convert each of said digital I and Q signals to antenna beam digital signals, each antenna beam digital signal corresponding with one steerable antenna beam.

7. A digital beam former (DBF) for providing digital signals to an array antenna, said DBF comprising:

a controller for determining geographic portions having a higher demand for communication services;

a transmit network module for converting transmit antenna beam digital signals to transmit digital I and Q signals based on coefficients; and a beam control module for providing coefficients to said transmit network module, wherein said controller causes said beam control module to provide a greater number of steerable antenna beams within said geographic portions having a higher demand for communication services and a lesser number of steerable antenna beams in said geographic portions having a lower demand for communication services by adjusting said coefficients, and wherein said array antenna is adapted for location on a non-geostationary satellite having movement with respect to earth's surface, and said controller has means for adjusting said coefficients as said satellite moves to maintain said greater number of steerable antenna beams for said geographic portions having said higher demand for communication services.

8. A DBF as claimed in claim 7 further comprising a receive network module for using receive coefficients to convert receive digital I and Q signals to receive antenna beam digital signals, each receive antenna beam digital signal representing one receive steerable antenna beam, said receive coefficients provided by said controller.

9. A DBF as claimed in claim 8 wherein said antenna array is adapted for location on a geostationary satellite and wherein a identified geographic portion has a predetermined higher demand for communication services, said identified geographic portion having a shape associated therewith, and wherein said controller has means for adjusting said coefficients to provide an antenna beam shaped to substantially cover said identified geographic portion.

10. A communication station comprising:

a digital beam former (DBF) for providing signals to an array antenna having a plurality of radiating elements that provides steerable antenna beams, said DBF providing for each radiating element, coefficients for controlling characteristics of said steerable antenna beams;

receiver modules for converting signals received from each of said radiating elements to receive I and Q digital signals, and providing said receive I and Q digital signals to said DBF; and transmitter modules for converting transmit I and Q digital signals provided by said DBF to signals for each of said radiating elements, wherein said DBF comprises:

a controller for determining geographic portions within a footprint region having a higher demand for communication services, and for determining geographic portions of said footprint region having a lower demand for communication services;

beam control modules for adjusting said coefficients to provide a greater number of said steerable antenna beams within said geographic portions having said higher demand for communication services and a lesser number of steerable antenna beams in said geographic portions having said lower demand for communication services;

a receive network module for using said coefficients to convert said receive digital I and Q digital signals to antenna beam digital signals, each antenna beam digital signal representing one steerable antenna beam; and a transmit network module for using said coefficients to convert transmit antenna beam digital signals to said transmit digital I and Q digital signals.

11. A communication station as claimed in claim 10 wherein the controller includes:

means for monitoring a real-time demand for communication services in different geographic portions of said footprint region;

means for adjusting said coefficients as said real-time demand for communication services changes;

means for providing re-adjusted coefficients to cause said array antenna provide additional antenna beams to geographic portions in response to increases in said real-time demand; and means for providing re-adjusted coefficients to cause said array antenna to removes antenna beams in geographic portions having a decrease in said real-time demand in response to decreases in said real-time demand.

12. A communication station as claimed in claim 11 wherein said controller re-adjusting said coefficients to provide antenna beams having small coverage regions to said geographic portions having said higher demand for communication services, and re-adjusts said coefficients to provide antenna beams having larger coverage regions to said geographic portions having said lower demand for communication services.

13. A communication station as claimed in claim 12 wherein said antenna array is adapted for location on a geostationary satellite and wherein said footprint region has an identified geographic portion therein having a predetermined higher demand for communication services, said identified geographic portion having a shape associated therewith, said controller has means for adjusting said coefficients to provide an antenna beam shaped to substantially cover said identified geographic portion.

14. A communication station as claimed in claim 12 wherein said array antenna is adapted for location on a non-geostationary satellite having movement with respect to earth's surface, said controller has means for further adjusting said coefficients as said satellite moves to maintain said greater number of steerable antenna beams for said geographic portions having said higher demand for communication services.

15. A communication station as claimed in claim 12 wherein said controller has means for converting communication signals received by each of said radiating elements to receive I and Q digital signals, and using said coefficients to convert each of said receive I and Q digital signals to antenna beam digital signals, each antenna beam digital signal corresponding with one steerable antenna beam.

* * * * *